Sept. 28, 1926.

W. J. O'BRIEN 1,601,538

VISUAL INDICATOR

Filed May 12, 1926

Inventor
William J. O'Brien.
By Samuel N. Pond, Atty.

Patented Sept. 28, 1926.

1,601,538

UNITED STATES PATENT OFFICE.

WILLIAM J. O'BRIEN, OF CHICAGO, ILLINOIS, ASSIGNOR TO BREMER-TULLY MANUFACTURING COMPANY, OF CHICAGO, ILLINOIS, A CORPORATION OF ILLINOIS.

VISUAL INDICATOR.

Application filed May 12, 1926. Serial No. 108,452.

This invention relates to improvements in indicators of the visual type and has been designed for use more particularly in connection with radio receiving apparatus to indicate the wave lengths of sending stations and facilitate the tuning of the receiving instrument to the exact wave length of any sending station which the user desires to get.

Mechanical indicators of this type are commonly provided with a movable scale marked in wave lengths and a fixed pointer co-operating therewith. In such instruments the original calibration of the scale is only approximate; and when applied to different instruments it is often found that the actual positions on the scale which correspond to the most accurate tuning are slightly to one side or the other of the indicated meter length scale divisions, so that the latter are more or less inaccurate. The principal object of the present invention is to provide a mechanical wave length indicator which, after it has been applied to any receiving instrument, may be experimentally tested and the scale then calibrated in such a way as to show the exact position to which the instrument is to be set to obtain accurate tuning of any given wave length or frequency.

In its preferred embodiment, the invention takes the form of a disc or tape movable across a window opening in a panel, said window being provided with a fixed fine or hair line lying crosswise of the periphery of the disc or the surface of the tape, and said disc periphery or tape being supplied with obliquely disposed scale lines indicating wave lengths in meters. In tuning any instrument to which the indicator is applied, the scale is moved across the window, and the points of intersection of the scale lines with the fixed hair line, which correspond to accurate tuning, are indicated by a dot, and these dots may then be connected by a calibration curve.

In order that the invention, its manner of use, and its advantages may be readily understood by those skilled in the art I have, in the accompanying drawing, illustrated a simple and practical embodiment thereof, and referring thereto—

Figure 1:
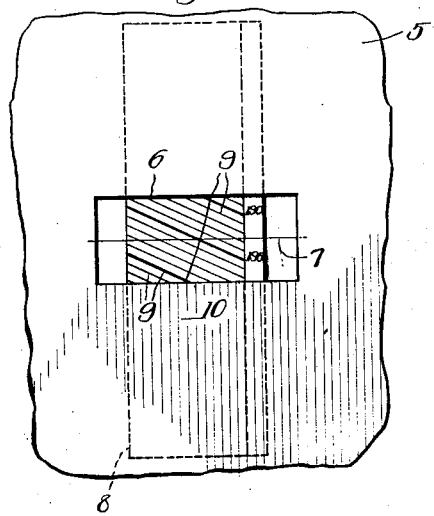
Fig. 1 is a fragmentary front elevation of a panel equipped with a window having a hair line thereon showing a portion of the periphery of a graduated dial disc lying therebehind.
Figure 2:
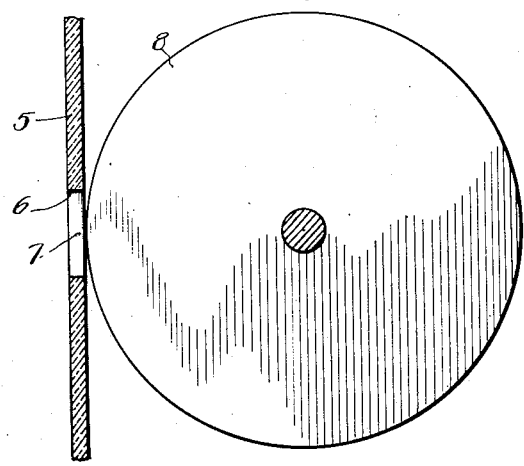
Fig. 2 is a side elevation of the dial disc with the panel and window in cross-section.
Figure 3:
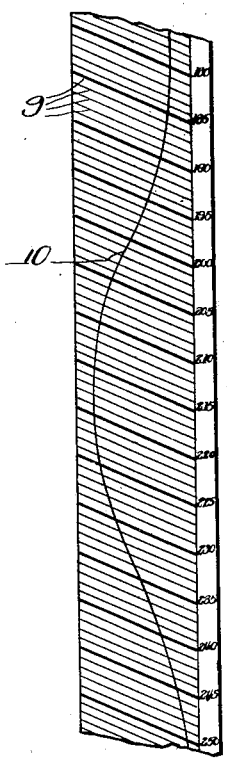
Fig. 3 is a developed plan of the graduated disc periphery or tape and the wave meter scale marked thereon showing a typical calibration curve.

Referring to the drawings, 5 may indicate a fragment of a fixed panel in which is formed a rectangular window opening 6 across which is stretched a fine wire, hair, or the like 7 forming a fixed indicating line. Behind the window 6 is a rotatable scale disc 8, the periphery of which moves across the rear side of the window opening. On the periphery of the disc 8 are graduated lines 9 constituting scale marks corresponding to wave meter lengths, these latter being numerically identified opposite one end of the lines. It will be noted that the hair line 7 is parallel with the axis of the scale disc, while the scale lines 9 are oblique to said axis. In any position of the scale disc, therefore, the hair line 8 intersects one or more of the oblique scale lines, and the scale range for any given wave length is between the high and low points of the scale line indicating that wave length.

The scale is first calibrated at the factory in such a way that the indicating line 7 will intersect the oblique scale lines 9 substantially mid-length of the latter. When applied to any particular receiving set, however, it may be found that this point of intersection does not exactly correspond with the accurate tuning of the instrument. In such case, the scale disc or band is moved in one direction or the other until the instrument is accurately tuned, and then the point of intersection of the indicating line 7 with the scale line 9 corresponding to the wave length tuned in is noted by a dot on the scale line. In the same way, the points on the other scale lines corresponding to accurate tuning in of the sending stations indicated thereby are noted on the dial scale, and these dots are then connected by the irregular line 10, which constitutes the calibration curve or line which is drawn on the scale by the user of the instrument. Thereafter, in order to tune in any desired station, the wave length of that station being known, the user moves the disc or tape to bring the indicating line 7 over the point of intersection of the calibration curve with the scale line 9 corresponding to the station sought, and the receiving set is thus quickly and accurately tuned.

Figure 4:
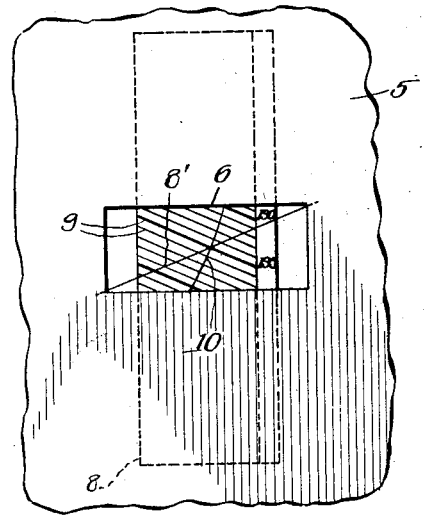
Fig. 4 is a view similar to Fig. 1 illustrating a slight modification of the fixed hair line on the window designed to increase the range of error over which change of calibration can be made.

In the modification illustrated in Fig. 4 the indicating line on the window, instead of being parallel with the axis of the scale, or perpendicular to the path of travel of the tape, is given an oblique direction reverse to the obliquity of the scale lines, as shown at 8'. Manifestly, this increases the range over which corrections may be made by the calibration line.

I claim—

1. In a visual indicator for radio receiving sets, the combination of a panel having a window opening, a fixed indicating line extending across said opening, and a dial member having a surface movable past said opening, said surface being marked with scale lines oblique to said fixed indicating line and intersecting the latter when viewed through said opening.

2. In a visual indicator for radio receiving sets, the combination of a panel having a window opening, a fixed indicating line extending across said opening, and a dial member having a surface movable past said opening, said surface being marked with scale lines oblique to said fixed indicating line and intersecting the latter when viewed through said opening, and a calibration curve drawn through the several points of intersection of said scale lines with said indicating line which correspond to accurate tuning.

3. In a visual indicator for radio receiving sets, the combination of a panel having a window opening, a fixed indicating line extending across said opening, and a dial member having a surface movable past said opening, said surface being marked with parallel scale lines oblique to the direction of travel of said surface and intersecting said fixed indicating line when viewed through said opening, and said indicating line being oppositely oblique to the direction of travel of said surface relatively to said scale lines.

WILLIAM J. O'BRIEN.